US012760938B2

(12) United States Patent
Morin et al.

(10) Patent No.: US 12,760,938 B2
(45) Date of Patent: Oct. 13, 2026

(54) IN-SITU SOLAR TRACKER MANUFACTURING

(71) Applicant: Nextpower LLC, Fremont, CA (US)

(72) Inventors: Jacob Mark Morin, Phoenix, AZ (US); Abhimanyu Anil Sable, Hyderabad (IN); Alexander W. Au, Oakland, CA (US)

(73) Assignee: NEXTPOWER LLC, Fremont, CA (US)

( * ) Notice: Subject to any disclaimer, the term of this patent is extended or adjusted under 35 U.S.C. 154(b) by 0 days.

(21) Appl. No.: 18/947,256

(22) Filed: Nov. 14, 2024

(65) Prior Publication Data

US 2025/0164154 A1 May 22, 2025

Related U.S. Application Data

(60) Provisional application No. 63/601,314, filed on Nov. 21, 2023.

(51) Int. Cl.

*B23K 37/00* (2025.01)
*B23K 37/053* (2006.01)
*F24S 30/425* (2018.01)
*H02S 20/32* (2014.01)
*F24S 30/00* (2018.01)

(52) U.S. Cl.

CPC .......... *F24S 30/425* (2018.05); *B23K 37/053* (2013.01); *H02S 20/32* (2014.12); *F24S 2030/136* (2018.05)

(58) Field of Classification Search

CPC ... F24S 30/425; F24S 2030/136; H02S 20/32; Y02E 10/47; B21C 37/0818; B21C 37/083; B21C 37/104; B21C 37/105; B21C 37/14; B21C 37/155; B21C 37/202; B21C 37/0803; B21H 8/005; B23K 37/053–0538; B23K 2101/04–125

USPC ....................... 228/5.7, 47.1–49.4, 144–152, 228/173.1–173.7

See application file for complete search history.

(56) References Cited

U.S. PATENT DOCUMENTS 2,950,376 A 8/1960 Wogerbauer
3,085,146 A 4/1963 Ferreruela
(Continued)

FOREIGN PATENT DOCUMENTS

AU 2021269157 A1 * 12/2022 ............. H02S 20/32
AU 2022100162 A4 * 12/2022 .............. F24S 25/10
(Continued)

OTHER PUBLICATIONS

International Searching Authority, "International Search Report and Written Opinion" , From Application No. PCT/US2024/055853, Mailed Feb. 13, 2025, pp. 16.

*Primary Examiner* — Kiley S Stoner

(74) *Attorney, Agent, or Firm* — Fredrikson & Byron, P.A.

(57) ABSTRACT

A method for manufacturing a continuous torque tube of a solar tracking system on site includes the steps of: placing raw material at a rolling apparatus on site; shaping the raw material into torque tube components at the rolling apparatus on site; joining the shaped torque tube components output from the rolling apparatus on site to create a continuous torque tube; and placing solar modules at the continuous torque tube to create a continuous solar tracker row.

15 Claims, 6 Drawing Sheets

(56) References Cited

U.S. PATENT DOCUMENTS

| | | | | |
|---|---|---|---|---|
| 6,058,930 | A * | 5/2000 | Shingleton | F24S 30/425 126/600 |
| 7,057,131 | B2 | 6/2006 | Krckels | |
| 9,905,717 | B2 * | 2/2018 | Au | H10F 77/63 |
| 11,525,604 | B1 * | 12/2022 | Delgado-Nanez | F24S 30/455 |
| 2003/0034029 | A1 * | 2/2003 | Shingleton | F24S 25/12 126/600 |
| 2004/0238025 | A1 * | 12/2004 | Shingleton | H02S 20/10 136/246 |
| 2008/0308142 | A1 * | 12/2008 | Grip | F24S 25/00 156/60 |
| 2011/0099923 | A1 * | 5/2011 | Ventura | F24S 30/452 136/246 |
| 2011/0253195 | A1 * | 10/2011 | Kim | H02S 20/32 136/246 |
| 2012/0180845 | A1 * | 7/2012 | Cole | H02S 20/20 136/246 |
| 2013/0153007 | A1 * | 6/2013 | Plesniak | H02S 20/30 136/251 |
| 2014/0026940 | A1 * | 1/2014 | Alonso Salmeron | F24S 30/425 136/246 |
| 2014/0090637 | A1 * | 4/2014 | Grushkowitz | H02S 20/30 464/183 |
| 2014/0196764 | A1 * | 7/2014 | Clavelle | H10F 77/488 136/246 |
| 2014/0261632 | A1 * | 9/2014 | Clavelle | H02S 20/32 136/246 |
| 2014/0270930 | A1 * | 9/2014 | Grushkowitz | F16D 1/033 403/337 |
| 2015/0015975 | A1 * | 1/2015 | Huss | F24S 23/70 359/853 |
| 2015/0059827 | A1 * | 3/2015 | Reed | F24S 30/425 136/246 |
| 2015/0207452 | A1 * | 7/2015 | Werner | F24S 50/20 136/246 |
| 2015/0372636 | A1 * | 12/2015 | Menard | F24S 25/50 136/246 |
| 2016/0190976 | A1 * | 6/2016 | Corio | F24S 25/634 248/214 |
| 2016/0218663 | A1 * | 7/2016 | Werner | F24S 30/425 |
| 2016/0365830 | A1 * | 12/2016 | Bailey | F24S 25/11 |
| 2016/0377325 | A1 * | 12/2016 | Au | H02S 20/32 126/606 |
| 2017/0294867 | A1 * | 10/2017 | Pesce | F24S 25/65 |
| 2018/0062563 | A1 * | 3/2018 | Bapat | F16D 1/04 |
| 2018/0062566 | A1 * | 3/2018 | Grushkowitz | F24S 30/425 |
| 2018/0062567 | A1 * | 3/2018 | Oh | H02S 20/32 |
| 2018/0062569 | A1 * | 3/2018 | Oh | H02S 30/10 |
| 2019/0036478 | A1 * | 1/2019 | Liu | H02S 20/32 |
| 2019/0137143 | A1 * | 5/2019 | Menard | F24S 30/458 |
| 2019/0292823 | A1 * | 9/2019 | Dally | E05D 7/081 |
| 2019/0292824 | A1 * | 9/2019 | Dally | F16D 1/02 |
| 2019/0296687 | A1 | 9/2019 | Morin et al. | |
| 2020/0052644 | A1 * | 2/2020 | Taha | H02S 10/00 |
| 2020/0076355 | A1 * | 3/2020 | Hudson | F24S 25/70 |
| 2020/0088446 | A1 * | 3/2020 | Dally | F24S 30/425 |
| 2020/0153382 | A1 * | 5/2020 | Ballentine | F24S 25/636 |
| 2020/0284293 | A1 * | 9/2020 | Pesce | F24S 25/65 |
| 2021/0017729 | A1 * | 1/2021 | Karkheck | E02D 5/805 |
| 2021/0218363 | A1 * | 7/2021 | Maldonado Ferreira | H02S 30/00 |
| 2021/0297037 | A1 * | 9/2021 | Dally | F16M 11/10 |
| 2022/0052637 | A1 * | 2/2022 | Delgado-Nanez | H02S 20/32 |
| 2022/0107117 | A1 * | 4/2022 | Delgado-Nanez | F24S 30/425 |
| 2022/0193927 | A1 * | 6/2022 | Mazzetti, Jr. | B25J 9/1697 |
| 2023/0072681 | A1 * | 3/2023 | Morankar | F24S 40/20 |
| 2023/0129712 | A1 * | 4/2023 | Delgado-Nanez | F24S 30/455 126/600 |
| 2023/0223891 | A1 * | 7/2023 | Rodriguez Gonzalez | H02S 20/32 136/246 |
| 2023/0279987 | A1 * | 9/2023 | Dally | F16M 11/10 248/550 |
| 2024/0007044 | A1 * | 1/2024 | Teruel Hernández | H02S 20/10 |
| 2024/0056018 | A1 * | 2/2024 | Conesa Rodríguez | H02S 20/32 |
| 2024/0113652 | A1 * | 4/2024 | Yang | H02S 20/32 |
| 2024/0136971 | A1 * | 4/2024 | McPheeters | H02S 20/32 |
| 2024/0136972 | A1 * | 4/2024 | Dally | F24S 50/20 |
| 2024/0162852 | A1 * | 5/2024 | Gómez García | H02S 20/32 |
| 2024/0240835 | A1 * | 7/2024 | Sokol | F24S 25/634 |
| 2024/0266992 | A1 * | 8/2024 | Urbanek | H02S 50/00 |
| 2024/0339959 | A1 * | 10/2024 | Thomsen | H02S 20/32 |
| 2024/0388243 | A1 * | 11/2024 | Maddulapalli | F24S 30/425 |
| 2025/0003638 | A1 * | 1/2025 | Sokol | F24S 30/425 |
| 2025/0007448 | A1 * | 1/2025 | Cherukupalli | H02S 20/30 |
| 2025/0088142 | A1 * | 3/2025 | Torres | F24S 30/428 |
| 2025/0119094 | A1 * | 4/2025 | Schuknecht | H02S 20/00 |
| 2025/0164154 | A1 * | 5/2025 | Morin | F24S 30/425 |
| 2025/0373195 | A1 * | 12/2025 | Au | H02S 20/32 |

FOREIGN PATENT DOCUMENTS

| | | | | | |
|---|---|---|---|---|---|
| BR | 112015028404 | B1 | * 12/2021 | | F24S 30/452 |
| CN | 1509398 | A | * 6/2004 | | F24S 30/452 |
| CN | 102124283 | A | * 7/2011 | | H02S 20/10 |
| CN | 202178266 | U | * 3/2012 | | |
| CN | 102865687 | A | * 1/2013 | | |
| CN | 102889690 | A | * 1/2013 | | |
| CN | 202748670 | U | * 2/2013 | | |
| CN | 103178139 | A | * 6/2013 | | H02S 20/32 |
| CN | 203240783 | U | * 10/2013 | | |
| CN | 203501515 | U | * 3/2014 | | |
| CN | 103697612 | A | * 4/2014 | | |
| CN | 205227889 | U | * 5/2016 | | |
| CN | 105637757 | A | * 6/2016 | | F24S 30/40 |
| CN | 106016793 | A | * 10/2016 | | F24S 30/425 |
| CN | 205864353 | U | * 1/2017 | | |
| CN | 107795576 | A | * 3/2018 | | F24S 30/425 |
| CN | 207354142 | U | * 5/2018 | | |
| CN | 110573807 | A | * 12/2019 | | F24S 25/12 |
| CN | 209801837 | U | * 12/2019 | | |
| CN | 112352379 | A | * 2/2021 | | F16H 19/04 |
| CN | 112987801 | A | * 6/2021 | | H02S 20/32 |
| CN | 113075781 | A | * 7/2021 | | G02B 7/183 |
| CN | 214506966 | U | * 10/2021 | | |
| CN | 215378828 | U | * 12/2021 | | |
| CN | 114008914 | A | * 2/2022 | | H10F 19/00 |
| DE | 934644 | C | 11/1955 | | |
| DE | 202011101252 | U1 | * 8/2011 | | H02S 20/32 |
| DE | 102010024546 | A1 | * 12/2011 | | F24S 23/30 |
| DE | 112013005890 | T5 | * 9/2015 | | H02S 20/32 |
| DE | 202015006430 | U1 | * 11/2015 | | F24S 30/425 |
| EP | 2778563 | A1 | * 9/2014 | | F24S 23/74 |
| EP | 2787303 | A1 | * 10/2014 | | F24S 30/425 |
| EP | 3121530 | A1 | * 1/2017 | | F24S 25/13 |
| EP | 4002685 | A1 | * 5/2022 | | H02S 20/32 |
| EP | 4142148 | A1 | * 3/2023 | | H10F 19/00 |
| ES | 2683746 | T3 | * 9/2018 | | F24S 25/65 |
| ES | 2869876 | T3 | * 10/2021 | | G01S 3/7861 |
| GB | 2476657 | A | * 7/2011 | | F24S 23/81 |
| IL | 286446 | A | * 10/2021 | | F24S 25/70 |
| KR | 20090066461 | A | * 6/2009 | | H02S 20/30 |
| KR | 20090108260 | A | * 10/2009 | | F24S 30/425 |
| KR | 20090108261 | A | * 10/2009 | | F24S 30/425 |
| KR | 20210104018 | A | * 8/2021 | | H02S 20/30 |
| WO | WO-2009127758 | A2 | * 10/2009 | | H02S 20/32 |
| WO | WO-2014110514 | A2 | * 7/2014 | | F24S 23/74 |
| WO | WO-2015051267 | A1 | * 4/2015 | | H02S 20/10 |
| WO | WO-2015104702 | A1 | * 7/2015 | | F24S 30/455 |
| WO | WO-2017007983 | A1 | * 1/2017 | | F24S 25/12 |
| WO | WO-2017155798 | A1 | * 9/2017 | | F16B 2/14 |
| WO | WO-2018044692 | A1 | * 3/2018 | | H02S 50/00 |
| WO | WO-2018075368 | A1 | * 4/2018 | | H02S 20/10 |
| WO | WO-2019043612 | A1 | * 3/2019 | | F24S 30/425 |
| WO | WO-2020076433 | A1 | * 4/2020 | | H02S 20/32 |
| WO | WO-2022056482 | A1 | * 3/2022 | | F16B 7/182 |
| WO | WO-2022177645 | A1 | * 8/2022 | | H10F 71/00 |
| WO | 2022242858 | A1 | 11/2022 | | |
| WO | WO-2023218486 | A1 | * 11/2023 | | H02S 20/32 |
| WO | WO-2024127230 | A1 | * 6/2024 | | H02S 20/32 |

(56) References Cited

FOREIGN PATENT DOCUMENTS

| | | | | | |
|---|---|---|---|---|---|
| WO | WO-2024243167 | A1 | * | 11/2024 | .............. F16C 33/20 |
| WO | WO-2025065007 | A1 | * | 3/2025 | ............. H02S 20/32 |
| WO | WO-2025085503 | A1 | * | 4/2025 | ....... B23K 26/08844 |

* cited by examiner

IN-SITU SOLAR TRACKER MANUFACTURING

RELATED APPLICATION

This disclosure claims priority to U.S. provisional patent application No. 63/601,314 filed on Nov. 21, 2023, the contents of which are hereby incorporated by reference.

TECHNICAL FIELD

This disclosure relates generally to device, system, and method embodiments for manufacturing one or more components of a solar tracker system on site at a same location where the solar tracker system is to then be installed and operated. Embodiments disclosed herein can help to reduce costs and timelines associated with solar tracker system installation and, thereby, can help to increase the availability of solar tracker system applications.

BACKGROUND

Solar modules can convert sunlight into energy using photovoltaic cells. Solar tracking systems can support a plurality of solar modules and function to rotate these solar modules amongst a variety of different angular orientations throughout a given day to optimize a solar irradiance angle and, thereby, optimize energy generation at the solar modules.

A conventional solar tracking system includes a plurality of torque tube components spliced together (e.g., using mechanical gear components to transfer torque) to form a row of the solar tracking system. A given conventional solar tracking system row can include many (e.g., tens) spliced together torque tubes to span the intended solar tracking system row. However, logistics and installation costs associated with these conventional solar tracking systems can be significant. For example, logistics costs associated with getting solar tracking system components on site are often quite substantial due, in large part, to the packing density of the torque tube components of the solar tracking system. For instance, logistics timing can be difficult due to the typical manufacturing lead times associated with torque tube manufacturing. Moreover, the length of each torque tube component of a typical solar tracking system can be limited by the length of shipping availability, typically the length of a flatbed truck. In addition, both toque tube handling on site and the necessary splicing together of the torque tube components on site can result in substantial labor cost and efforts.

SUMMARY

This disclosure in general describes embodiments of devices, systems, and methods for manufacturing one or more components of a solar tracker system on site at a same location where the solar tracker system is to then be installed and operated. For example, embodiments disclosed herein can be configured to manufacture on site from raw material a continuous solar tracking system component, such as a continuous torque tube. For the example of a continuous torque tube, the continuous torque tube can be manufactured on site from raw material to, for instance, substantially span a length of a solar tracking system row. Thus, as compared to conventional solar tracking systems that utilize a plurality of torque tubes typically limited in length to the length of a flatbed truck that is used for transportation to the site, embodiments disclosed herein for manufacturing a continuous torque tube on site can help to reduce or eliminate the need for splicing together separate, smaller length torque tubes. This ability to manufacture the continuous torque tube on site as an integrated component substantially spanning a length of a solar tracking system row can help reduce or eliminate the need for otherwise splicing together separate torque tube components for a given row and, thereby provide useful advantages in terms of time and cost savings.

One embodiment includes a method for manufacturing a continuous torque tube of a solar tracking system on site where the solar tracking system will subsequently operate. This method embodiment includes the steps of placing raw material at a rolling apparatus on site; shaping the raw material into torque tube components at the rolling apparatus on site; joining the shaped torque tube components output from the rolling apparatus on site to create a continuous torque tube; and placing solar modules at the continuous torque tube to create a continuous solar tracker row.

In a further embodiment of this method, shaping the raw material into torque tube components at the rolling apparatus on site can include shaping the raw material into two or more torque tube components (e.g., three torque tube components) at the rolling apparatus on site. For instance, the raw material can be a raw material coil, such as a steel coil. In one particular example, the raw material can be a precoated steel coil, for instance, precoated with a coating (e.g., weather resist coating) on at least one side of the steel coil. Shaping the coil at the rolling apparatus can include using two or more steel form rollers to shape a planar coil raw material into one or more (e.g., two or more) non-planar torque tube component(s).

In a further embodiment of this method, joining the shaped torque tube components output from the rolling apparatus on site to create a continuous torque tube can include seaming together two or more shaped torque tube components output from the rolling apparatus on site to create a continuous torque tube. For example, a joining apparatus can be located on site, and the joining apparatus can receive two or more shaped torque tube components output from the rolling apparatus on site. The joining apparatus on site can join (e.g., seam) together the two or more shaped torque tube components output from the rolling apparatus on site to create the continuous torque tube on site from the two or more shaped torque tube components output from the rolling apparatus on site.

In a further embodiment of this method, placing solar modules at the continuous torque tube to create a continuous solar tracker row can include placing a plurality of solar modules at the continuous torque tube (e.g., after the shaped torque tube components have been shaped and joined on site). For example, in some embodiments, at least one of the torque tube components can be shaped (e.g., at the rolling apparatus on site) to include a solar module support surface and. As such, in this example, joining the shaped torque tube components output from the rolling apparatus on site to create a continuous torque tube can include seaming together at least one torque tube component shaped to include a solar module support surface and at least one other shaped torque tube component, output from the rolling apparatus on site, to create a continuous torque tube that includes a solar module support surface. The solar module support surface created at the shaped torque tube component, and thus present at the continuous torque tube, can, for instance, be a planar outer surface created at the shaped torque tube component, and thus present at the continuous torque tube. In certain embodiments, placing a plurality of solar modules at the continuous torque tube can include placing the plurality of solar modules directly onto the solar module support surface present at the continuous torque tube (e.g., mounting the plurality of solar modules directly onto the solar module support surface such that the plurality of solar modules contact the solar module support surface). This can, for instance, help to reduce or eliminate the need for solar module mounting rails which are used in conventional solar tracking systems to mount a solar module to a torque tube (e.g., to indirectly mount solar modules to a curved surface of the torque tube via the mounting rail).

Another embodiment includes a solar tracking system. This solar tracking system embodiment includes a plurality of solar modules and a continuous torque tube. The continuous torque tube includes two or more shaped torque tube components that are joined (e.g., seamed) together to form the continuous torque tube. At least one of the shaped torque tube components that are joined together can include a solar module support surface. The plurality of solar modules are mounted to the continuous torque tube at (e.g., directly at) the solar module support surface. For example, the solar module support surface at the shaped torque tube component, and thus present at the continuous torque tube, can, for instance, be a planar outer surface at the shaped torque tube component, and thus present at the continuous torque tube.

In a further embodiment of this system, the continuous torque tube can span substantially a length of a row of the solar tracking system. For example, the row of the solar tracking system can include a motive source to impart rotation at the continuous torque tube, and the continuous torque tube can a as a result be caused to rotate about a continuous torque tube rotational axis. The length of the row of the solar tracking system can be greater than, and thus the length of the continuous torque tube can be greater than, fifty feet in length, greater than seventy five feet in length, greater than one hundred feet in length, greater than two hundred feet in length, or greater than five hundred feet in length. For instance, at least ten, at least twenty, at least fifty, at least one hundred, or at least two hundred solar modules can be mounted at the continuous torque tube. In one particular such example, at least ten, at least twenty, at least fifty, at least one hundred, or at least two hundred solar modules can be mounted directly to the solar module support surface at the continuous torque tube (e.g., with each of these solar modules contacting the solar module support surface at the continuous torque tube, for instance, without any mounting rail between these solar modules contacting the solar module support surface).

An additional embodiment includes a continuous torque tube manufacturing system. This system embodiment includes a rolling apparatus and a joining apparatus. The rolling apparatus includes an input that is configured to receive torque tube raw material (e.g., a planar coil portion), and the rolling apparatus includes two or more form rollers (e.g., two or more light-gauge steel form rollers). The rolling apparatus is configured to shape the torque tube raw material, received at its input, using the two or more form rollers and to output two or more shaped torque tube components (e.g., two or more non-planar torque tube components). The joining apparatus is located downstream of the rolling apparatus, and the joining apparatus is configured to receive the two or more shaped torque tube components output from the rolling apparatus. The joining apparatus is configured to join the two or more shaped torque tube components to create a continuous torque tube.

In a further embodiment of this system, the rolling apparatus can further be configured to shape the torque tube raw material, received at its input, to include a solar module support surface using the two or more form rollers. In such embodiments, the rolling apparatus can thus be configured to shape the torque tube raw material, received at its input, to include a solar module support surface at least one shaped torque tube component and to output two or more shaped torque tube components with at least one of these output torque tube components including the solar module support surface. For example, the rolling apparatus can be configured to shape the planar raw material into: (i) at least one torque tube component that includes a planar solar module support surface at an outer surface of that at least one torque tube component, and (ii) at least one torque tube component that includes a non-planar outer surface of that at least one torque tube component.

In a further embodiment of this system, the joining apparatus can be configured to receive the two or more shaped torque tube components output from the rolling apparatus and join these two or more shaped torque tube components in the geometry at which they are output from the rolling apparatus. In some such examples, the joining apparatus can be positioned downstream of the output of the rolling apparatus and the joining apparatus can be configured to receive the two or more shaped torque tube components directly from the output of the rolling apparatus. The joining apparatus can be configured to join the two or more shaped torque tube components output from the rolling apparatus using one or more suitable joining techniques. For instance, the joining apparatus can be configured to join the two or more shaped torque tube components output from the rolling apparatus using seaming, such as welding, friction seaming, and/or metal clinching.

In a further embodiment of this system, the system can further include a mobile vehicle at which the rolling apparatus and the joining apparatus are positioned. The mobile vehicle can be configured to manufacture, using at least the rolling apparatus and the joining apparatus at the mobile vehicle, a first continuous torque tube for an extent of a first row of a solar tracking system at a first location at the site and then, after manufacturing that first continuous torque tube at that first location of the first row, the mobile vehicle can be configured to move along a ground surface at the site to a second, different location at the site to manufacture, using at least the rolling apparatus and the joining apparatus at the mobile vehicle, a second continuous torque tube for an extent of a second row of a solar tracking system at a second location at the site. In some applications of the mobile vehicle, the extent of the first continuous torque tube can be manufactured to be substantially equal to an entire length of the first row of the solar tracking system at the site and the extent of the second continuous torque tube can be manufactured to be substantially equal to an entire length of the second row of the solar tracking system at the site.

The details of one or more examples are set forth in the accompanying drawings and the description below. Other features, objects, and advantages will be apparent from the description and drawings.

BRIEF DESCRIPTION OF DRAWINGS

The following drawings are illustrative of particular examples of the present invention and therefore do not limit the scope of the invention. The drawings are intended for use in conjunction with the explanations in the following detailed description wherein like reference characters denote like elements. Examples of the present invention will hereinafter be described in conjunction with the appended drawings.

FIG. 3A is a perspective view of a segment of the continuous torque tube with solar modules mounted thereto. FIG. 3B is a longitudinal cross-section of the segment of the continuous torque tube with solar modules mounted thereto.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Embodiments disclosed herein include various devices, systems, and methods configured to help reduce cost and time associated with solar tracking system installation. Embodiments disclosed herein can be configured to manufacture one or more components of a solar tracker system on site at a same location where the solar tracker system is to then be installed and operated. For example, embodiments disclosed herein teach such manufacture of a continuous torque tube component for a row of a solar tracking system, though other embodiments within the scope of this disclosure could include similar applications for manufacturing other continuous solar tracking system components in addition to, or alternative to, one or more continuous torque tube components.

As noted, embodiments disclosed herein can be configured to manufacture on site from raw material (e.g., a raw material coil, such as a precoated steel coil) a continuous torque tube. This continuous torque tube can be manufactured on site from raw material to, for instance, substantially span a length of a solar tracking system row. For instance, the continuous torque tube can be present at both ends of a solar tracking system row and/or the continuous torque tube can be integral along the length of the solar tracking row (e.g., the continuous torque tube lacks any spliced connection to an adjacent torque tube at the row). Thus, as compared to conventional solar tracking systems that utilize a plurality of torque tubes typically limited in length to the length of a flatbed truck that is used to transport the plurality of torque tubes to the site, embodiments disclosed herein for manufacturing a continuous torque tube on site can help to reduce or eliminate the need for splicing together separate, smaller length torque tubes. This ability to manufacture the continuous torque tube on site as an integrated (e.g., seamed) component substantially spanning a length of a solar tracking system row to help reduce or eliminate the need for otherwise splicing together separate torque tube components for a given row can provide useful advantages in terms of time and cost savings (e.g., reduced installation lead times; reduced installation/labor costs; reduced installation times in the field; etc.).

Figure 1:
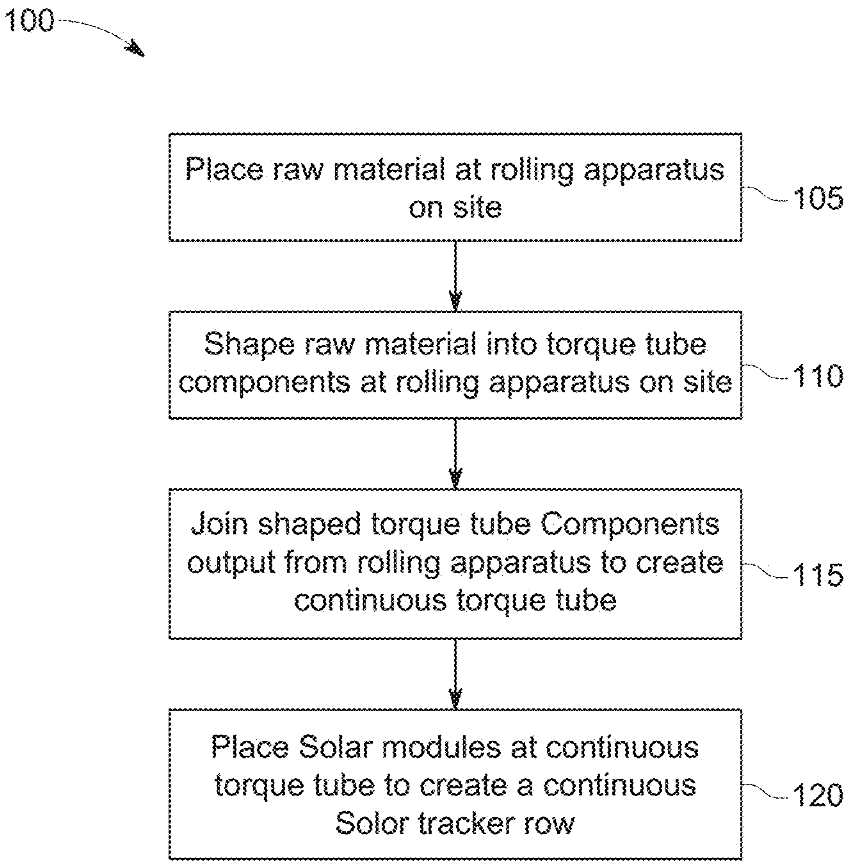
FIG. 1 is a flow diagram of an embodiment of a method for manufacturing a continuous torque tube of a solar tracking system on site.
Figure 2:
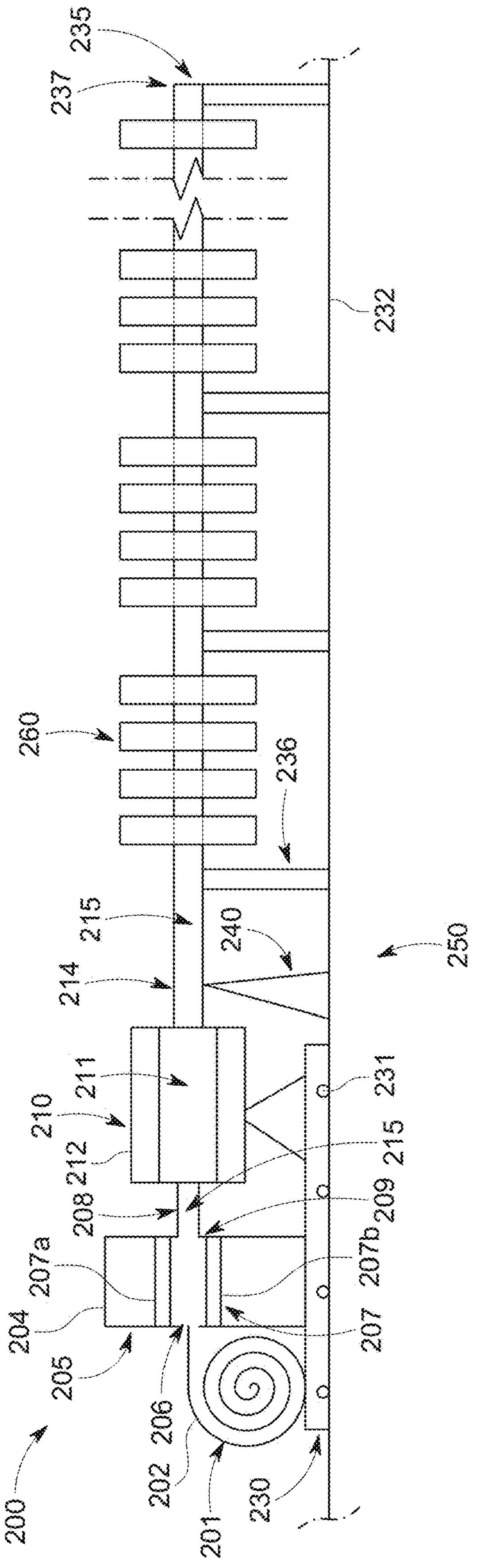
FIG. 2 is a block diagram of an embodiment of a continuous torque tube manufacturing system, for instance, that can be used, at least in part, to execute method embodiments disclosed herein for manufacturing a continuous torque tube of a solar tracking system on site.

FIG. 1 shows a flow diagram of an embodiment of a method 100 for manufacturing a continuous torque tube of a solar tracking system on site. To help illustrate various examples of the method 100, FIG. 2 is referenced along with the description of the method 100. FIG. 2 is a block diagram of an embodiment of a continuous torque tube manufacturing system 200. The continuous torque tube manufacturing system 200 can be used to execute at least some steps of the method 100 to manufacture a continuous torque tube of a solar tracking system on site.

As shown at FIG. 2, the continuous torque tube manufacturing system 200 can include a rolling apparatus 205 and a joining apparatus 210. The rolling apparatus 205 can be configured to receive raw material at a site 250 and shape this raw material into one or more torque tube components, such as at least two shaped torque tube components, at the site 250. The joining apparatus 210 can be configured to receive the shaped torque tube components at the site 250 and join these shaped torque tube components together at the site 250 to create a continuous torque tube. The continuous torque tube can then be installed at the same site 250 at which it was created from the raw material using the rolling apparatus 205 and the joining apparatus 210. For example, the continuous torque tube created at the site 250 from the raw material using the rolling apparatus 205 and the joining apparatus 210 can be an integral, continuous torque tube that spans a length of a row of a solar tracking system (e.g., the integral, continuous torque tube can span substantially an entire length of a row of a solar tracking system; the integral, continuous torque tube can span a length greater than fifty feet in length, greater than seventy five feet in length, greater than one hundred feet in length, greater than two hundred feet in length, or greater than five hundred feet in length).

The rolling apparatus 205 can include a housing 204 that defines an input 206 to the rolling apparatus 205. At the housing 204 (e.g., within the housing 204), the rolling apparatus 205 can include one or more form rollers 207. The illustrated example of the rolling apparatus 205 includes two form rollers 207*a*, 207*b* spaced apart from one another. Another embodiment of the rolling apparatus 205 can include three or more form rollers 207 spaced apart from one another. The form rollers 207 can be, for instance, light-gauge steel form rollers or other suitable mechanism to shape an input raw material. The input 206 can be configured to receive torque tube raw material 201. For example, the torque tube raw material 201 can be a coil, such as a steel coil, for instance, a precoated steel coil. A planar coil portion 202 of the torque tube raw material 201 can be placed at the input 206 of the rolling apparatus 205, and the rolling apparatus 205 can be configured to shape the planar coil portion 202 into one or more shaped (e.g., non-planar) torque tube components 208. The rolling apparatus 205 can include an outlet 209, such as at the housing 204, and the rolling apparatus 205 can be configured to receive the torque tube raw material 201 (e.g., planar coil portion 202) at the input 206, shape this received torque tube raw material 201 (e.g., change the planar coil portion 202 to a non-planar torque tube component), and output at the outlet 209 one or more shaped torque tube components 208 (e.g., two or more shaped torque tube components 208).

The joining apparatus 210 can be configured to join together two or more shaped torque tube components 208 to form a continuous torque tube 214. The joining apparatus 210 can include a joining mechanism 211 at a housing 212. The joining apparatus 210, using the joining mechanism 211, can be configured to join two or more shaped torque tube components 208. For example, the joining apparatus 210, using the joining mechanism 211, can be configured to join two or more shaped torque tube components 208 output from the rolling apparatus 205. As such, in some examples, the joining apparatus 210 can be located downstream of the rolling apparatus 205 (e.g., the joining apparatus 210 can be located distal to the outlet 209 of the rolling apparatus 205). The joining mechanism 211 can be any suitable mechanism for joining two or more shaped torque tube components 208 (e.g., as output from the rolling apparatus 205). For example, the joining mechanism 211 can include a seaming device at the joining mechanism 211 and the joining mechanism 211 can thus be configured to seam together the two or more shaped torque tube components 208 (e.g., as output from the rolling apparatus 205). As illustrative examples, the joining mechanism 211 can be configured to seam together two or more shaped torque tube components 208 using welding, friction seaming, and/or metal clinching. When two or more shaped torque tube components 208 are joined (e.g., seamed) together, the two or more shaped torque tube components 208 can become integrated and form the continuous torque tube 214 output from the joining apparatus 210.

In some embodiments, the continuous torque tube manufacturing system 200 can be configured to manufacture the continuous torque tube 214 to include a solar module support surface 215. For example, the rolling apparatus 205 can be configured to shape the torque tube raw material 201, received at its input 206, to include the solar module support surface 215 using the two or more form rollers 207. The rolling apparatus 205 can thus be configured to shape the torque tube raw material 201, received at its input 206, to include the solar module support surface 215 at at least one of the shaped torque tube components 208 and to output two or more shaped torque tube components 208 with at least one of these output torque tube components 208 including the solar module support surface 215. For example, the rolling apparatus 205 can be configured to shape the planar raw material 202 into: (i) at least one torque tube component 208 that includes a planar solar module support surface 215 at an outer surface of that at least one torque tube component 208, and (ii) at least one torque tube component 208 that includes a non-planar outer surface of that at least one torque tube component 208.

The joining apparatus 210 can be configured to receive the two or more shaped torque tube components 208 output from the rolling apparatus 205 and join these two or more shaped torque tube components 208 in the geometric configuration at which the two or more shaped torque tube components 208 are output from the rolling apparatus 205. In some such examples, the joining apparatus 210 can be configured to join one shaped torque tube component 208, having the solar module support surface 215, from the rolling apparatus 205 to another shaped torque tube component 208 also from the rolling apparatus 205. As one particular such example, the joining apparatus 210 can be configured to join (e.g., scam) together: (i) at least one shaped torque tube component 208, which includes a planar solar module support surface 215 at an outer surface of that at least one torque tube component 208, from the rolling apparatus 205 to (ii) at least one shaped torque tube component 208, which includes a non-planar outer surface at that at least one torque tube component 208, from the rolling apparatus 205.

In a further embodiment, the continuous torque tube manufacturing system 200 can include a mobile vehicle 230. The mobile vehicle 230 can include one or more wheels 231 such that the mobile vehicle 230 is configured to move along, and relative to, a ground surface 232. The mobile vehicle 230 can have the rolling apparatus 205 and/or the joining apparatus 210 positioned at the mobile vehicle 230 such that the mobile vehicle 230 is configured to move the rolling apparatus 205 and/or the joining apparatus 210 along, and relative to, the ground surface 232. Thus, in some examples, the mobile vehicle 230 can be configured to manufacture, using at least the rolling apparatus 205 and the joining apparatus 210 at the mobile vehicle 230, a first continuous torque tube 214 for an extent (e.g., substantially an entire length of) of a first row 235 of a solar tracking system at a first location at the site 250 and then, after manufacturing that first continuous torque tube 214 at that first location of the first row 235, the mobile vehicle 230 can be configured to move along a ground surface 232 at the site 250 to a second, different location at the site 250 to manufacture, using at least the rolling apparatus 205 and the joining apparatus 210 at the mobile vehicle 230, a second continuous torque tube for an extent (e.g., substantially an entire length of) of a second row of a solar tracking system at a second, different row location at the site 250. In some applications of the mobile vehicle 230, the extent of the first continuous torque tube 214 can be manufactured to be substantially equal to an entire length of the first row 235 of the solar tracking system at the site 250 and the extent of the second continuous torque tube can be manufactured to be substantially equal to an entire length of the second row of the solar tracking system at the site 250.

In some embodiments, the continuous torque tube manufacturing system 200 can further include a temporary continuous torque tube support 240. The temporary continuous torque tube support 240 can be configured to provide a temporary support to the continuous torque tube 214 output from the joining apparatus 210. In some such embodiments, the temporary continuous torque tube support 240 can be positioned at the mobile vehicle 230, along with the rolling apparatus 205 and/or joining apparatus 210, and configured to support the continuous torque tube 214 output from the joining apparatus 210 at the mobile vehicle 230. In other such embodiments, the temporary continuous torque tube support 240 can be positioned at the ground surface 232 (e.g., adjacent to the mobile vehicle 230) and configured to support the continuous torque tube 214 output from the joining apparatus 210 at the ground surface 232. As illustrative examples, the temporary continuous torque tube support 240 can have multiple legs configured to contact the support substrate and could be, for instance, a tripod or other suitable mechanism. Once a pier 236 is installed and supported at the ground surface 232 to provide permanent support to the continuous torque tube 214, the temporary continuous torque tube support 240 can be removed.

With the foregoing description of one exemplary continuous torque tube manufacturing system 200 as context, the following will describe execution of the method 100 for manufacturing a continuous torque tube of a solar tracking system on site.

At step 105, the method 100 includes placing raw material at a rolling apparatus on site. Referring to the illustrated, exemplary continuous torque tube manufacturing system 200, at step 105, the method 100 can include placing raw material 201 at the rolling apparatus 205 at solar tracking system installation site 250. This can include, for instance, placing a planar coil portion 202 of the raw material at the input 206 of the rolling apparatus 205.

At step 110, the method 100 includes shaping the raw material into torque tube components at the rolling apparatus on site. Referring to the illustrated, exemplary continuous torque tube manufacturing system 200, at step 110, the raw material 201 can be shaped into two or more shaped torque tube components 208 at the rolling apparatus 205 on site 250. This can include, for instance, shaping the planar coil portion 202 into two or more shaped torque tube components 208 using the form rollers 207 at the rolling apparatus 205 at site 250. For instance, shaping at step 110 can include the rolling apparatus 205 shaping the planar raw material 202 into: (i) at least one torque tube component 208 that includes a planar solar module support surface 215 at an outer surface of that at least one torque tube component 208, and (ii) at least one torque tube component 208 that includes a non-planar outer surface of that at least one torque tube component 208.

At step 115, the method 100 includes joining the shaped torque tube components output from the rolling apparatus on site to create a continuous torque tube. Referring to the illustrated, exemplary continuous torque tube manufacturing system 200, at step 115, two or more shaped torque tube components 208 output from the rolling apparatus 205 at site 250 can be joined to create continuous torque tube 214. For instance, step 115 can include using the joining apparatus 210 to join (e.g., scam) together two or more shaped torque tube components 208 output from the rolling apparatus 205 at site 250 to create continuous torque tube 214. In examples, where at least one of these shaped torque tube components 208 output from the rolling apparatus 205 include the planar solar module support surface 215, the joining apparatus 210 can be configured to join (e.g., seam) together: (i) at least one shaped torque tube component 208, which includes a planar solar module support surface 215 at an outer surface of that at least one torque tube component 208, from the rolling apparatus 205 to (ii) at least one shaped torque tube component 208, which includes a non-planar outer surface at that at least one torque tube component 208, from the rolling apparatus 205.

At step 120, the method 100 includes placing solar modules at the continuous torque tube to create a continuous solar tracker row. Referring to the illustrated, exemplary continuous torque tube manufacturing system 200, at step 120, a plurality of solar modules 260 can be placed at the continuous torque tube 214 to create a continuous solar tracker row 235.

For example, the continuous solar tracker row 235 can have the continuous torque tube 214 extending along substantially the entire length of the continuous solar tracker row 235 such that the continuous torque tube 214 is present at both a first end 237 of the continuous solar tracker row 235 and an opposite, second end of the continuous solar tracker row 235. Additionally or alternatively, the continuous torque tube 214 can be integral along the length of the continuous solar tracking row 235. For instance, the continuous torque tube 214 can lack any spliced connection (e.g., geared connection) to an adjacent torque tube at the row 235 as, indeed, it may be that the continuous torque tube 214 is the only torque tube needed for the entire length of the continuous row 235. Thus, as compared to conventional solar tracking systems that utilize a plurality of torque tubes, typically limited in length to the length of a flatbed truck, installed and spliced together during installation at the site, the continuous torque tube 214 manufactured at the same site it is to be installed for the row 235 as disclosed herein can help to reduce or eliminate the need for splicing together separate, smaller length torque tubes. This can provide useful cost and time savings associated with solar tracking system installation.

FIGS. 3-6 illustrate exemplary embodiments of a continuous torque tube. In some cases, the continuous torque tube embodiments disclosed with respect to FIGS. 3-6 can be manufactured at the same site the continuous torque tube is to be installed, for instance, using any one or more of features disclosed elsewhere herein. For example, the continuous torque tube embodiments disclosed with respect to FIGS. 3-6 can be manufactured at the same site the continuous torque tube is to be installed, for instance, using any one or more of the features and techniques disclosed elsewhere herein with respect to the continuous torque tube manufacturing system. As one particular such example, the continuous torque tube embodiments disclosed with respect to FIGS. 3-6 can be manufactured at the same site the continuous torque tube is to be installed, for instance, using features of the method 100 and/or system 200 disclosed elsewhere herein.

Figure 3A:
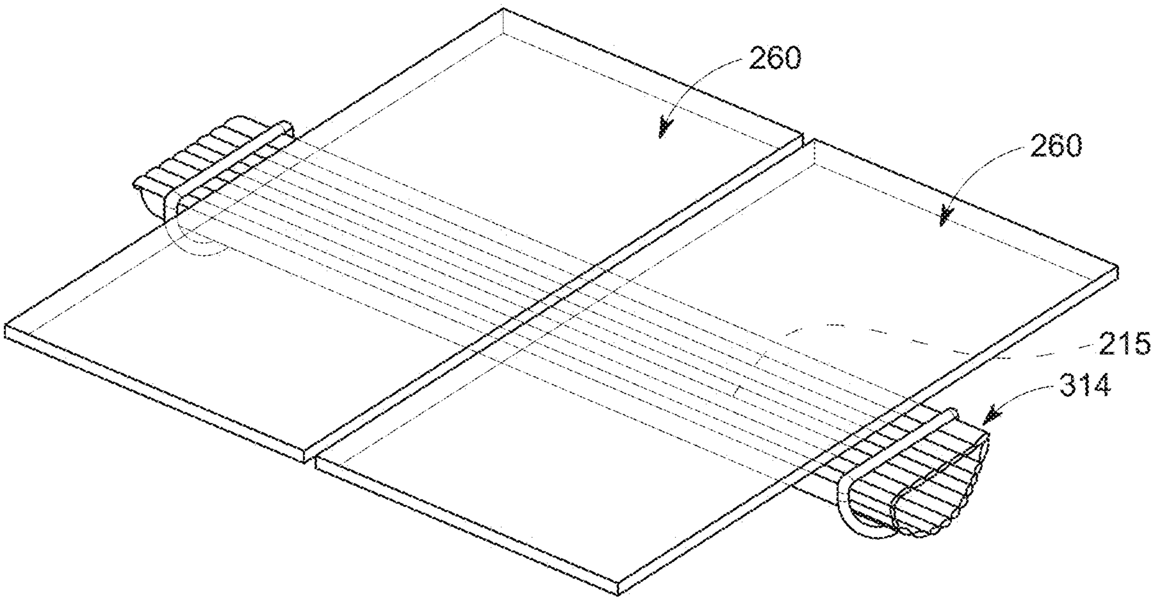
FIGS. 3A and 3B illustrate one embodiment of a continuous torque tube.
Figure 3B:
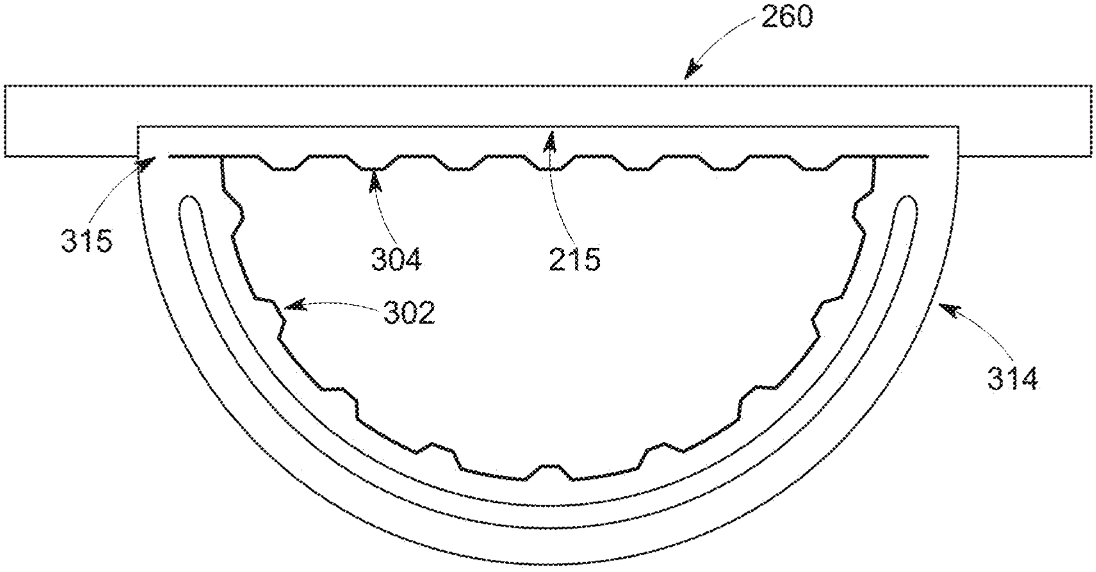

FIGS. 3A and 3B illustrate one embodiment of a continuous torque tube 314. FIG. 3A is a perspective view of a segment of the continuous torque tube 314 with solar modules 260 mounted thereto, and FIG. 3B is a longitudinal cross-section of the segment of the continuous torque tube 314 of FIG. 3A. The continuous torque tube 314 can have one or more of the features disclosed elsewhere herein with respect to a continuous torque tube (e.g., can have one or more of the features disclosed elsewhere herein with respect to continuous torque tube 214).

The continuous torque tube 314 can be formed from two joined, shaped torque tube components 302, 304. The torque tube components 302, 304 can be shaped, for instance using a rolling apparatus, such as described elsewhere herein, and the two shaped torque tube components 302, 304 can be joined, for instance using a joining apparatus, such as described elsewhere herein, to form the continuous torque tube 314. For example, the two shaped torque tube components 302, 304 can be joined by seaming (e.g., welding, friction seaming, metal clinching, etc.) the two or more shaped torque tube components 302, 304 together. Thus, the continuous torque tube 314 can include one or more seamed connections 315 at one or more interfaces between the two shaped torque tube components 302, 304 to join the two shaped torque tube components 302, 304 together.

The continuous torque tube 314 can include the solar module support surface 215 at at least one of the two shaped, joined torque tube components 302, 304. The solar module support surface 215 can be configured to receive thereat one or more solar modules 260. For example, the solar module support surface 215 can be configured to directly receive and contact the one or more solar modules 260 thereat and, as such, can be configured to eliminate the need for mounting rails to attach solar module(s) 260 to the continuous torque tube 314. As illustrated here, the solar module support surface 215 can include a planar solar module support surface at an outer surface of at least one of the two joined, shaped torque tube components 302, 304. Here, the planar solar module support surface is included at an outer surface of the shaped torque tube component 304 while the shaped torque tube component 302, joined (e.g., seamed) to the shaped torque tube component 304, includes an outer surface with a curved, non-planar geometric profile. As noted previously herein, the rolling apparatus can be configured to shape the torque tube raw material to include the solar module support surface 215 (e.g., using the two or more form rollers).

Figure 4:
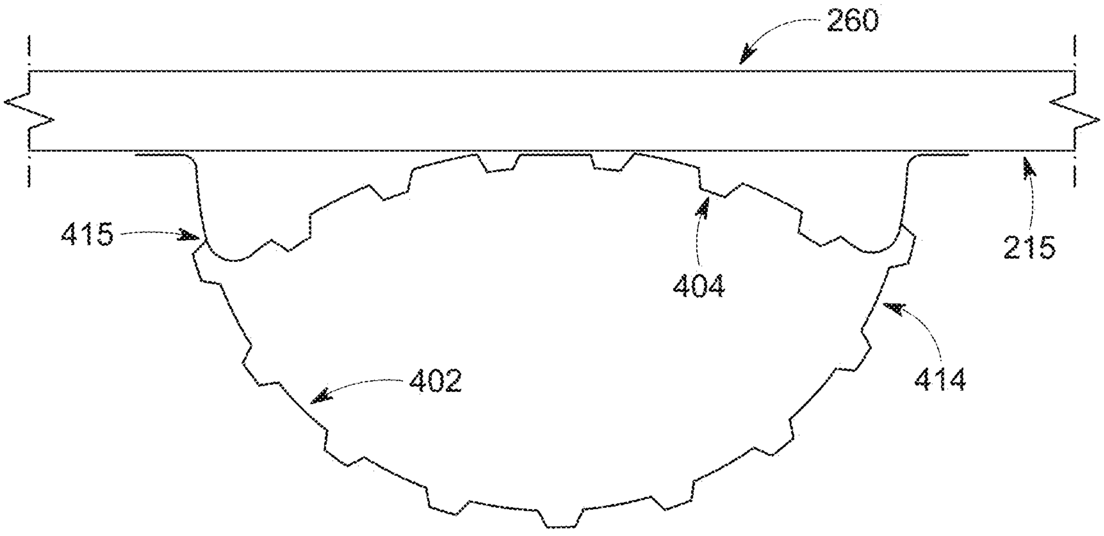
FIG. 4 is a cross-section of a segment of another embodiment of a continuous torque tube.

FIG. 4 is a cross-section of a segment of another embodiment of a continuous torque tube 414. The continuous torque tube 414 can have one or more of the features disclosed elsewhere herein with respect to a continuous torque tube (e.g., can have one or more of the features disclosed elsewhere herein with respect to continuous torque tubes 214 and/or 314).

The continuous torque tube 414 can be formed from two joined, shaped torque tube components 402, 404. The torque tube components 402, 404 can be shaped, for instance using a rolling apparatus, such as described elsewhere herein, and the two shaped torque tube components 402, 404 can be joined, for instance using a joining apparatus, such as described elsewhere herein, to form the continuous torque tube 414. For example, the two shaped torque tube components 402, 404 can be joined by seaming (e.g., welding, friction seaming, metal clinching, etc.) the two or more shaped torque tube components 402, 404 together. Thus, the continuous torque tube 414 can include one or more seamed connections 415 at one or more interfaces between the two shaped torque tube components 402, 404 to join the two shaped torque tube components 402, 404 together.

The shaped torque tube component 404 of the continuous torque tube 414 can include the solar module support surface 215 at one side of the shaped torque tube component 404 that is to receive the solar module 260 and can include a curved surface at an opposite side of the shaped torque tube component 404. Thus, as illustrated for the exemplary embodiment shown here, the shaped torque tube component 404 can include a planar solar module support surface 215 at one side of the shaped torque tube component 404 that is to receive the solar module 260 and at an opposite side of the shaped torque tube component 404 can include a curved outer surface at the shaped torque tube component 404. As noted elsewhere herein the solar module support surface 215 can be configured to receive thereat one or more solar modules 260, for instance, the solar module support surface 215 can be configured to directly receive and contact the one or more solar modules 260 thereat and, as such, can be configured to eliminate the need for mounting rails to attach solar module(s) 260 to the continuous torque tube 314. The curved outer surface at the shaped torque tube component 404 opposite the solar module support surface 215 can be joined, at least along a portion of this curved outer surface, to the other shaped torque tube component 402. This other shaped torque tube component 402 can include a curved outer surface that can joined to the curved outer surface at the shaped torque tube component 404 opposite the solar module support surface 215. Thus, the one or more seamed connections 415 can be present at the interface between the curved outer surfaces of the shaped torque tube components 402, 404.

Figure 5:
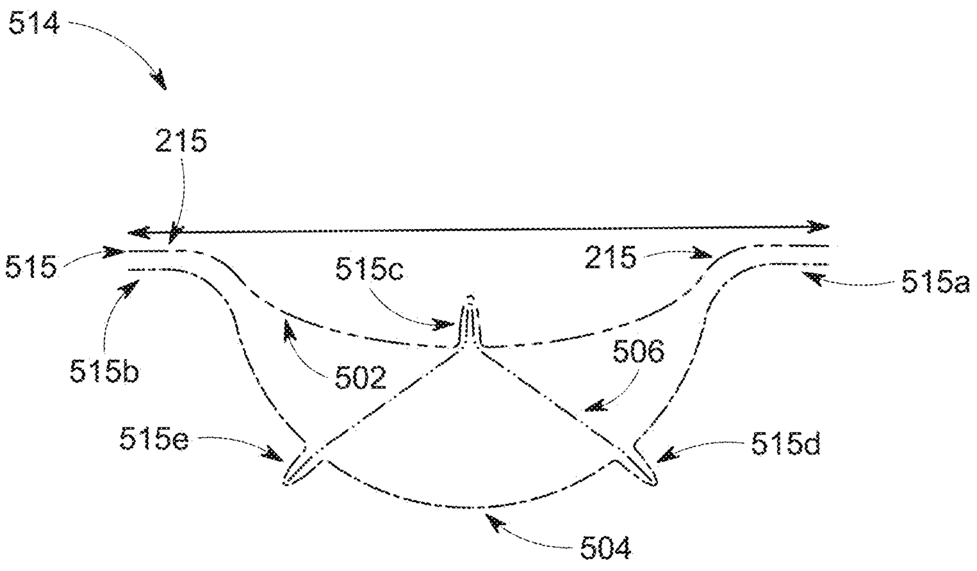
FIG. 5 is a cross-section of a segment of yet another embodiment of a continuous torque tube.

FIG. 5 is a cross-section of a segment of yet another embodiment of a continuous torque tube 514. The continuous torque tube 514 can have one or more of the features disclosed elsewhere herein with respect to a continuous torque tube (e.g., can have one or more of the features disclosed elsewhere herein with respect to continuous torque tubes 214, 314 and/or 414).

The continuous torque tube 514 can be formed from three joined, shaped torque tube components 502, 504, 506. The torque tube components 502, 504, 506 can be shaped, for instance using a rolling apparatus, such as described elsewhere herein, and the three shaped torque tube components 502, 504, 506 can be joined, for instance using a joining apparatus, such as described elsewhere herein, to form the continuous torque tube 514. For example, the three shaped torque tube components 502, 504, 506 can be joined by seaming (e.g., welding, friction seaming, metal clinching, etc.) the three, or more, shaped torque tube components 502, 504, 506 together. The continuous torque tube 514 can include multiple seamed connections 515 at two or more interfaces between the three shaped torque tube components 502, 504, 506 to join the three shaped torque tube components 502, 504, 506 together.

As noted, the continuous torque tube 514 shown at the embodiment of FIG. 5 includes three shaped torque tube components 502, 504, 506. A first shaped torque tube component 502 can form a top portion (e.g., top outer surface) of the continuous torque tube 514 and form the solar module support surface 215. The solar module support surface 215 at the first shaped torque tube component 502 of the continuous torque tube 514 can, for instance, include one or more planar surfaces at the lateral ends of the first shaped torque tube component 502, with a central portion of the first shaped torque tube component 502 between these planar lateral ends extending downward to define a concave profile between the planar lateral solar module support surface 215 ends at the first shaped torque tube component 502. A second shaped torque tube component 504 can form a bottom portion (e.g., bottom outer surface) of the continuous torque tube 514 and can include a curved outer surface. The second shaped torque tube component 504 can be joined (e.g., seamed) to the first shaped torque tube component 502 at seamed connections 515*a* and/or 515*b*. Thus, the second shaped torque tube component 504 can be joined to the first shaped torque tube component 502 at seamed connections 515*a* and 515*b* at the lateral ends where the solar module support surface 215 is present at the first shaped torque tube component 502. A third shaped torque tube component 506 can form an interior portion of the continuous torque tube 514. The third shaped torque tube component 506 can be joined (e.g., seamed) to the first shaped torque tube component 502 and/or the second shaped torque tube component 504. For example, as illustrated here, the third shaped torque tube component 506 is joined (e.g., seamed) to each of the first shaped torque tube component 502 and the second shaped torque tube component 504. The third shaped torque tube component 506 is joined to the first shaped torque tube component 502 at seamed connection 515*c*, which can be at a central portion of the continuous torque tube 514 between the lateral ends where the solar module support surfaces 215 are present. And, in the illustrated example, the third shaped torque tube component 506 is joined to the second shaped torque tube component 504 at seamed connections 515*d* and 515*e*, which can be at a bottom portion of the continuous torque tube 514 and offset laterally from the location of the seamed connection 515*c* between the first and second shaped torque tube components 502, 504. Thus, the illustrated embodiment includes five seamed connections to join the first, second, and third shaped torque tube components 502, 504, 506 and thereby form the continuous torque tube 514.

Figure 6:
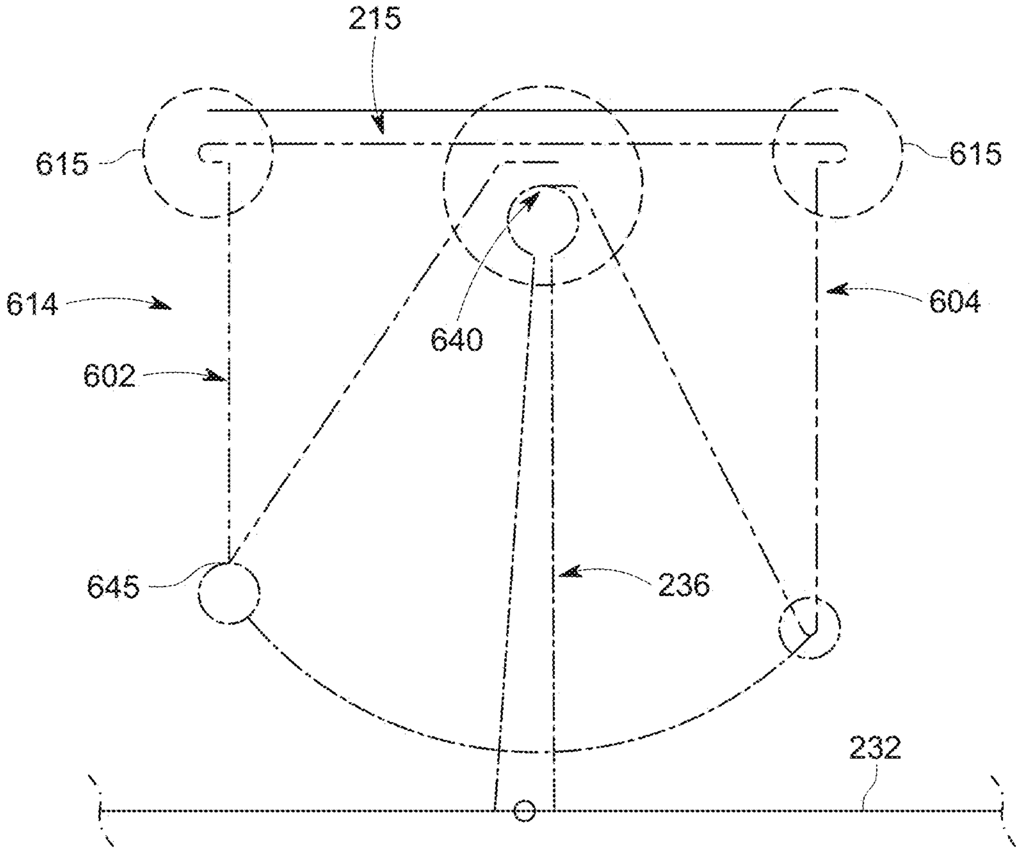
FIG. 6 is a cross-section of a segment of a further embodiment of a continuous torque tube.

FIG. 6 is a cross-section of a segment of a further embodiment of a continuous torque tube 614. The continuous torque tube 614 can, in some instances, resemble a sort of "dual continuous torque tube." The continuous torque tube 614 can have one or more of the features disclosed elsewhere herein with respect to a continuous torque tube (e.g., can have one or more of the features disclosed elsewhere herein with respect to continuous torque tubes 214, 314, 414 and/or 514).

The continuous torque tube 614 can be formed from at least two joined, shaped torque tube components 602, 604. The torque tube components 602, 604 can be shaped, for instance using a rolling apparatus, such as described elsewhere herein, and the shaped torque tube components 602, 604 can be joined, for instance using a joining apparatus, such as described elsewhere herein, to form the continuous torque tube 614. For example, the two torque tube components 602, 604 can be joined by seaming (e.g., welding, friction seaming, metal clinching, etc.) the two, or more, shaped torque tube components 602, 604 together.

The continuous torque tube 614 can include multiple seamed connections 615 at two or more interfaces between the shaped torque tube components 602, 604 to join the shaped torque tube components 602, 604 together. For example, the continuous torque tube 614 can include at least two seamed connections 615 joining the shaped torque tube components 602, 604 together and extending along a length of the continuous torque tube 614.

In some examples, the continuous torque tube 614 can be supported at the ground surface 232 by pier 236, and the continuous torque tube 614 can be configured to utilize the pier 236 to help stabilize and join the shaped torque tube components 602, 604 together at the bottom surface of the continuous torque tube 614. For example, one shaped torque tube component 602 can have an end surface positioned at a distal end 640 of the pier 236, and, likewise, the other shaped torque tube component 604 can have an end surface positioned at the distal end 640 of the pier 236. And, the end surface of the shaped torque tube component 602 can be joined to the end surface of the shaped torque tube component 604 at the distal end 640 of the pier 236.

The shaped torque tube components 602, 604 joined together can form a relatively elongated solar module support surface 215. For example, the solar module support surface 215 can extend substantially along an entire width of the continuous torque tube 614. For instance, in some applications, the solar module support surface 215 can span at least 400 mm in width, at least 500 mm in width, at least 600 mm in width, or at least 750 mm in width. This can include, for instance, the solar module support surface 215 spanning at least 400 mm in width from one seamed connection 615 at one longitudinal side of the continuous torque tube 614 to another seamed connection 615 at another, opposite longitudinal side of the continuous torque tube 614. As disclosed elsewhere herein, the solar module support surface 215 at the top side of the continuous torque tube 614 can be planar (e.g., flat) along the extend of its noted span. The bottom portion of the continuous torque tube 614, opposite the planar solar module support surface 215, can have a bottom-most point 645 along the bottom portion at or near a longitudinal end side, for instance substantially aligned with the seamed connection 615 at the longitudinal end side, and the bottom portion of the continuous torque tube 614 can have a top-most point along the bottom portion at or near the distal end 640 of the pier 236.

Various examples have been described. These and other examples are within the scope of the above disclosure.

What is claimed is:

1. A method for manufacturing a continuous torque tube of a solar tracking system, the method comprising the steps of:

placing raw material at an input of a rolling apparatus;

shaping the raw material at the rolling apparatus to create two or more shaped torque tube components from the raw material, the two or more shaped torque tube components comprising: (i) at least one non-planar shaped torque tube component comprising a non-planar outer surface, and (ii) at least one shaped torque tube component comprising a planar solar module support surface at an outer surface of the at least one shaped torque tube component;

joining the two or more shaped torque tube components at the site to create the continuous torque tube; and after joining the two or more shaped torque tube components to create the continuous torque tube, placing one or more solar modules at the planar solar module support surface.

2. The method of claim 1, wherein the raw material comprises a precoated planar coil, and wherein the rolling apparatus is configured to shape the precoated planar coil to create the two or more shaped torque tube components.

3. The method of claim 2, wherein the rolling apparatus is configured to shape the precoated planar coil at the site to create the two or more shaped torque tube components.

4. The method of claim 3, wherein shaping the precoated planar coil at the rolling apparatus comprises using two or more rollers to shape the precoated planar coil into each of: (i) the at least one non-planar shaped torque tube component comprising the non-planar outer surface, and (ii) at least one shaped torque tube component comprising the planar solar module support surface at the outer surface of the at least one shaped torque tube component.

5. The method of claim 1, wherein placing the one or more solar modules at the planar solar module support surface at the outer surface of the at least one shaped torque tube component comprises mounting the one or more solar modules directly onto the planar solar module support surface such that the one or more solar modules contact the planar solar module support surface.

6. The method of claim 1, wherein the two or more shaped torque tube components are joined to create the continuous torque tube using a joining apparatus, the joining apparatus having an input in communication with an output of the rolling apparatus.

7. The method of claim 6, wherein the rolling apparatus and the joining apparatus are each supported at a mobile vehicle such that the two or more shaped torque tube components are created at the rolling apparatus and fed to the joining apparatus at the mobile vehicle.

8. The method of claim 7, wherein, after joining the two or more shaped torque tube components to create the continuous torque tube, supporting the continuous torque tube at a temporary continuous torque tube support that is positioned downstream of the joining apparatus and upstream of a pier location.

9. The method of claim 6, wherein the joining apparatus seams together the two or more shaped torque tube components received from the rolling apparatus to create the continuous torque tube.

10. The method of claim 9, wherein the rolling apparatus is configured to shape the raw material at the site to create the two or more shaped torque tube components, and wherein the joining apparatus seams together (i) the at least one non-planar shaped torque tube component comprising the non-planar outer surface, and (ii) at least one shaped torque tube component comprising the planar solar module support surface at the outer surface of the at least one shaped torque tube component.

11. The method of claim 1, wherein the continuous torque tube is an integral continuous torque tube spanning a length of a row of the solar tracking system.

12. A continuous torque tube manufacturing system comprising:

a rolling apparatus comprising a rolling apparatus input, a rolling apparatus output, and two or more rollers disposed between the rolling apparatus input and the rolling apparatus output, the rolling apparatus configured to receive raw material at the rolling apparatus input and to shape the raw material, using the two or more rollers, into two or more shaped torque tube components, the two or more shaped torque tube components comprising: (i) at least one non-planar shaped torque tube component comprising a non-planar outer surface, and (ii) at least one shaped torque tube component comprising a planar solar module support surface at an outer surface of the at least one shaped torque tube component; and a joining apparatus positioned downstream of the rolling apparatus, the joining apparatus comprising a joining apparatus input, a joining apparatus output, and a joining mechanism disposed between the joining apparatus input and the joining apparatus output, the joining apparatus configured to receive and join together the at least one non-planar shaped torque tube component and the at least one shaped torque tube component to create a continuous torque tube that includes the planar solar module support surface for receiving one or more solar modules.

13. The system of claim 12, wherein the joining apparatus is configured to seam together the at least one non-planar shaped torque tube component and the at least one shaped torque tube component to create the continuous torque tube.

14. The system of claim 12, further comprising:

one or more solar modules mounted in direct contact with the planar solar module support surface at the outer surface of the continuous torque tube.

15. The method of claim 1, wherein each of the raw material is shaped and the two or more shaped torque tube components are joined at a location adjacent to the solar tracking system.

* * * * *